United States Patent [19]

Sarantakis

[11] 3,855,198

[45] Dec. 17, 1974

[54] NOVEL INTERMEDIATES FOR SYNTHESIS OF-L-(5-OXOPROLYL)-L-HISTIDY-L-TRYPTOPHYL-L-SERYL-L-TYROSYL-L-GLYCYL-L-LEUCYL-L-ARGINYL-L-PROLYL-GLYCINE AMIDE

[75] Inventor: Dimitrios Sarantakis, Audubon, Pa.

[73] Assignee: American Home Products Corporation, New York, N.Y.

[22] Filed: Sept. 29, 1972

[21] Appl. No.: 293,715

[52] U.S. Cl............................... 260/112.5, 424/177
[51] Int. Cl..................... C07c 103/52, A61k 27/00
[58] Field of Search................................. 260/112.5

[56] References Cited
UNITED STATES PATENTS

| 3,780,014 | 12/1973 | Flouret | 260/112.5 |
| 3,790,555 | 2/1974 | Flouret et al. | 260/112.5 |

OTHER PUBLICATIONS

Geiger et al., Biochem. Biophys, Res. Comm. 45, 767 (1971).

Chang et al., J. Med. Chem., 15, 623, (June 1972).

Primary Examiner—Lewis Gotts
Assistant Examiner—Reginald J. Suyat

[57] ABSTRACT

A process for the synthesis of LRF, i.e. L-(5-oxoprolyl)-L-histidyl-L-tryptophyl-L-seryl-L-tyrosyl-glycyl-L-leucyl-L-arginyl-L-prolyl-glycine amine by the classical route is described which comprises coupling a tetrapeptide, azide terminated, representing the 3-6 amino acid sequence in LRF with a C-amide terminated tetrapeptide representing the 7-10 amino acid sequence in LRF and thereafter converting the resulting octapeptide to LRF. Novel tetrapeptides and octapeptides useful as intermediates are described.

24 Claims, No Drawings

NOVEL INTERMEDIATES FOR SYNTHESIS OF L-(5-OXYPROLYL)-L-HISTIDY-L-TRYPTOPHYL-L-SERYL-L-TYROSYL-L-GLYCYL-L-LEUCYL-L-ARGINYL-L-PROLYL-GLYCINE AMIDE

This invention relates to the synthesis of the decapeptide which is the luteinizing hormone-releasing factor, novel intermediates used in such synthesis and the synthesis of such intermediates.

The luteinizing hormone releasing factor (hereafter called LRF) is the decapeptide, L-(5-oxoprolyl-L-histidyl-L-tryptophyl-L-seryl-L-tyrosyl-glycyl-L-leucyl-L-arginyl-L-prolyl-glycine amide. This decapeptide is secreted by the hypothalamus and carried to the adenohyprophysis where it stimulates the release of the luteinizing hormone and the follicle stimulating hormone.

Numerous routes of synthesis have been reported in the literature for LRF using solid phase synthesis, classical synthesis or a combination of these methods. Solid phase synthesis has been described by R. B. Merrifield, J. Amer. Soc., 85, 2144, (1963); J. M. Stewart and J. D. Young, Solid Phase Peptide Synthesis, W. H. Freeman and Co., San Francisco, 1969; and Solid Phase Synthesis of LRF by Monahan et al., C. R. Acad. Sc., Paris, 273, 508 (1971); H. Sievertsson et al., Biochem. Biophys. Res. Commun., 44, 1566, (1971); H. Matsuo et al., Biochem. Biophys. Res. Commun. 45, 822, (1971); P. Rivaille et al., Hel. Chim. Acta., 54, 2772, (1971). The use of the classical method of synthesis has recently been described by J. K. Chang et al., J. Med Chem., 15, 623, (1972) and Geiger et al., Biochem. Biophys Res. Commun., 45, 767 (1971) also reported by synthesis of LRF by the classical method. A combination of solid phase and classicial methods has also been described by Sievertsson et al., supra.

We have found that solid phase synthesis has certain drawbacks including lack of rigid control at each step of the synthesis route over purity of the various amino acid sequences used in the synthesis.

One aspect of the present invention provides for a novel synthesis of LRF by the classical method in which racemization reactions are minimized and yields and overall purity of LRF are high.

Another aspect of the present invention relates to processes for synthesizing tetrapeptide intermediates used in the preparation of LRF.

Yet a further aspect of the present invention relates to novel tetrapeptide and octapeptide intermediates used in the synthesis of LRF.

These and other aspects of the present invention will become apparent from the foregoing description.

The novel tetrapeptides of the present invention are represented by the structural formulae:

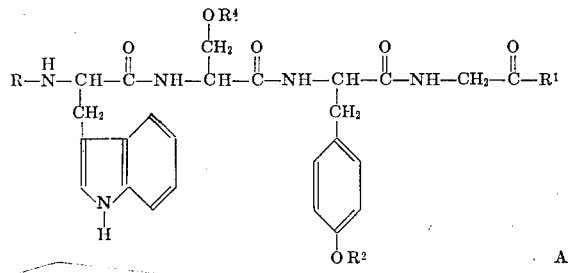

A

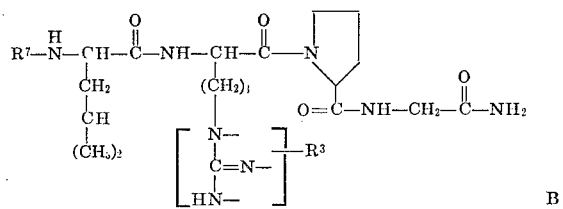

B wherein:
R is an α-amino protecting group;
$R^1$ is a member selected from the class consisting of $-NHNH_2$, $-NHNH-R^6$, $N_3$ and $OR^5$;
$R^2$ is a protecting group for the phenolic hydroxyl group of tyrosine;
$R^4$ is selected from the class consisting of hydrogen and a protecting group for the alcoholic hydroxyl group;
$R^3$ is a protecting group for the $N^\delta$, $N^\omega$ and $N^{\omega^1}$ nitrogen atoms of arginine or $R^3$ is hydrogen; with the proviso that at least one but not more than two of the three side chain nitrogen atoms contain a protecting group. The location of the protecting group is controlled by the particular protecting radical selected.
$R^5$ is an α-carboxyl protecting group;
$R^6$ is a hydrazide protecting group which is easily cleaved such as illustrated by tert-butyloxycarbonyl, trityl and benzyloxycarbonyl.
$R^7$ is either hydrogen or a protecting group defined by R linked to the α-amino group of leucine;

In formula B where $R^7$ is hydrogen, the tetrapeptide may also be in the form of its acid addition salt. Illustrative of such salts are hydrobromide, hydrochloride, acetate and trifluoroacetate.

The foregoing tetrapeptides of formulas A and B may also be written as follows:

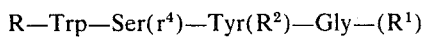

A

B wherein
$N^G$ refers to the side chain nitrogen atoms in arginine;
$R^2$ refers to the protecting group on the phenolic hydroxyl group of tyrosine;
$R^4$ refers to hydrogen on the alcoholic oxygen atom in serine or the protecting group on such oxygen atom;
R, $R^1$, $R_3$ and $R_7$ have the same meaning as previously described.

Nomenclature used for peptides is described by Schroder and Lubke, The Peptides, 1, pages viii–xxix (Academic Press 1965) and in Biochemistry 11, pp. 1726–1732, (1972).

Included within the scope of the present invention is a novel octapeptide of the formula:

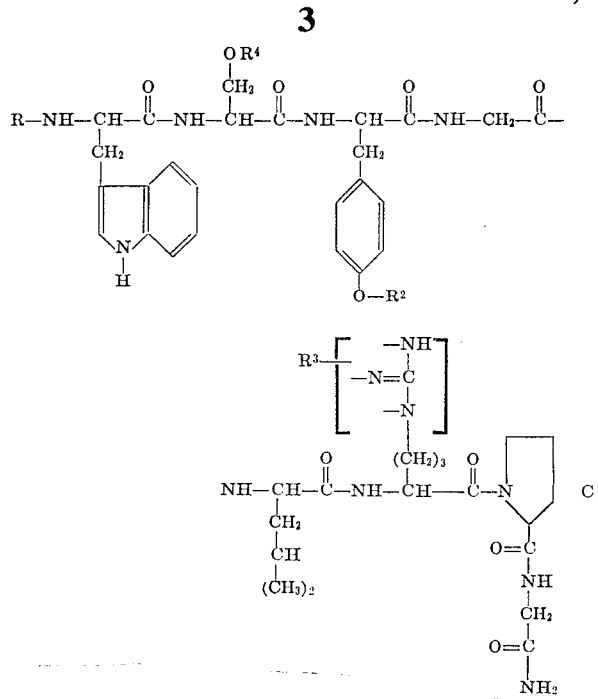

wherein R, R², R³ and R⁴ have the same meaning previously described.

The α-amino protecting groups contemplated by R and R⁷ are those known to be useful in the art in the step-wise synthesis of polypeptides. The selection of an α-amino protecting group throughout the synthesis should fulfill the following requirements (a) retain its protecting properties (i.e. not be split off under coupling conditions), (b) not give rise to side reactions or otherwise interfere in the synthesis and (c) be readily and selectively removable so that other protecting groups from the same or other functional groups can be retained (i.e. not split off) where desired during the synthesis. Among the classes of α-amino protecting groups are (1) acyl type protecting groups illustrated by the following: formyl, trifluoroacetyl, phthalyl, toluenesulfonyl (tosyl), benzenesulfonyl, nitrophenylsulfenyl, tritylsulfenyl, o-nitrophenoxyacetyl, chloroacetyl, acetyl, γ-chlorobutyryl, etc.; (2) aromatic urethan type protecting groups illustrated by benzyloxycarbonyl and substituted benzyloxycarbonyl such as p-chlorobenzyloxycarbonyl, p-nitrobenzyloxycarbonyl, p-bromobenzyloxycarbonyl, p-methoxybenzyloxycarbonyl; (3) aliphatic urethan protecting groups illustrated by tert-butyloxycarbonyl, diisopropylmethoxycarbonyl, isopropyloxycarbonyl, ethoxycarbonyl, allyloxycarbonyl; (4) cycloalkyl urethan type protecting groups illustrated by cyclopentyloxycarbonyl, adamantyloxycarbonyl, cyclohexyloxycarbonyl; (5) thio urethan type protecting goups such as phenylthiocarbonyl; (6) alkyl type protecting groups as illustrated by triphenylmethyl (trityl), benzyl; (6) trialkylsilane groups such as trimethylsilane.

The preferred α-amino protecting groups defined by R and R⁷ are selected from the class consisting of tert-butyloxycarbonyl, trityl, phthalyl, tosyl, allyloxycarbonyl, cyclopentyloxycarbonyl, tert-amyloxycarbonyl and aromatic urethan type of the formula:

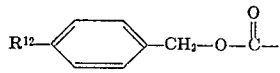

wherein:

$R^{12}$ is selected from the class consisting of hydrogen, halo, lower alkoxy or nitro; preferably $R^{12}$ is hydrogen.

The carboxyl protecting group represented by $R^5$ is one which is stable under the conditions used to deprotect the α-amino group and may be selected from the class consisting of straight chain $C_1$–$C_6$ lower alkyl (e.g. methyl, ethyl, butyl, pentyl), benzyl, substituted benzyl wherein the substituent is selected from at least one of nitro, methoxy and methyl (e.g. p-methoxybenzyl, p-nitrobenzyl, 2,4-dimethoxybenzyl, 2,4,6-trimethylbenzyl, pentamethylbenzyl), phenacyl, phthalimidomethyl, β-methylthioethyl, 4-picolyl and 4-(methylthio)phenyl. Preferably $R^5$ is lower alkyl, benzyl or substituted benzyl.

Representative of $R^2$ and $R^4$ hydroxyl protecting groups for serine and tyrosine are acetyl, tosyl, benzoyl, tert-butyl, trityl, benzyl, benzyloxycarbonyl. The preferred protecting group is benzyl.

The protecting group on the $N^\delta$, $N^\omega$ and $N^{\omega^1}$ of arginine is illustrated by nitro, tosyl, benzyloxycarbonyl, adamantyloxycarbonyl and trityl. In the case of nitro or tosyl the protecting group is on either one of the $N^\omega$, $N^{\omega^1}$ nitrogens and in the case of benzyloxycarbonyl, trityl or adamantyloxycarbonyl, the protecting group is on the $N^\delta$ nitrogen and either one of the $N^\omega$, $N^{\omega^1}$ nitrogen atoms.

The process of the present invention for producing LRF in which the intermediates of formulas A, B and C are used has as one of its aspects the folloiwng reaction scheme:

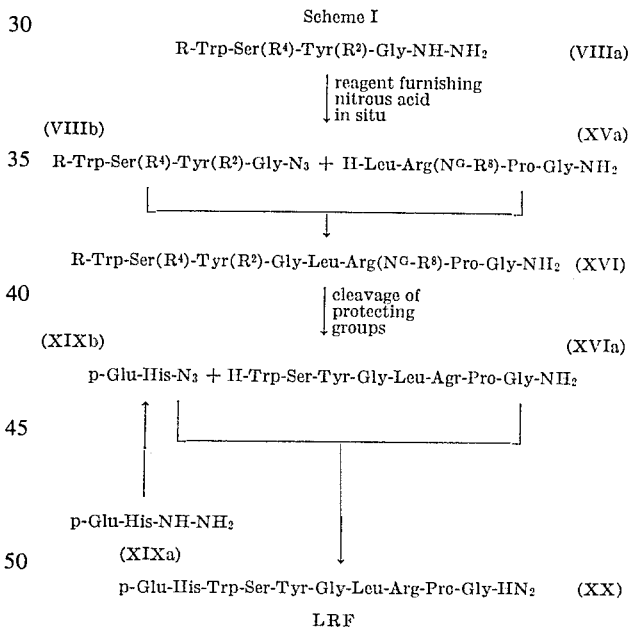

LRF

R, $R^2$ and $R^4$ have the same meaning as previously defined. $R^8$ is either the same as $R^3$ or hydrogen (deprotected arginine).

In reaction scheme I, the tetrapeptide of formula VIIIa is converted to the corresponding azide of formula VIIb by reaction with a reagent which furnishes nitrous acid in situ. Suitable reagents for this purpose include a lower alkyl nitrite (e.g. tert-butyl nitrite, isoamyl nitrite) or an alkali metal nitrite salt (e.g. sodium nitrite, potassium nitrite) in the presence of a strong acid such as hydrochloric, phosphoric, sulfuric, etc. This reaction is carried out in the presence of either water and/or a non-aqueous solvent such as dimethylformamide, tetrahydrofuran, dioxane, chloroform, methylene chloride, toluene, etc. at a temperature between about −40°C. and +20°C. The azide of formula VIIIb which is preferably not isolated from the reaction medium is then coupled with the tetrapeptide of formula XVa to yield the octapeptide of formula XVI, this reaction also being carried out between about −40°C. and +50°C., preferably between about −25°C. and 10°C. An acid acceptor is present in the reaction medium if the tetrapeptide of formula XVa is added to the reaction vessel in the form of its acid addition salt (e.g. HBr, HCl, acetate, etc.) in order to liberate the free base in situ which reacts with the azide of formula VIIIb. Suitable acid acceptors include tertiary amines (e.g. triethylamine, pyridine, quinoline, dimethylaniline, etc.), alkali metal carbonates or other acid binding agents known in the art.

The octapeptide of formula XVI is then reacted with a cleaving reagent to obtain the deprotected octapeptide of formula XVIa as the free base or preferably as an acid addition salt. The selection of a suitable cleaving reagent is dependent on the nature of the protecting groups. For example, if R is benzyloxycarbonyl, $R^2$ is benzyl, the nitro group is on arginine and no protecting group is on serine, hydrogenation over a palladium catalyst in acetic acid will remove all of these groups. Other cleaving reagents that can be used include HBr in acetic acid, alcoholic solution of HCl, sodium in liquid ammonia, trifluoroacetic acid and others well known in the peptide art. The selection of a compatible reagent for removal of various well known α-amino and side chain protecting groups is described by Schroeder and Lubke supra, pp. 72–74, the disclosure of which is incorporated herein by reference. If desired, the deprotection of the octapeptide can be carried out stepwise to remove the α-amino group without cleavage of side-chain groups to provide an octapeptide of the formula H—Trp—Ser($R^2$)—Tyr($R^4$)—Gly—Leu—Arg($N^G$—$R^8$)—Pro—Gly—$NH_2$(XVIb). This can be accomplished by using as the cleaving reagent trifluoroacetic acid which does not remove the nitro group on arginine or benzyl group on tyrosine or serine (if present) but will cleave an α-amino protecting group such as tert-butyloxy carbonyl. The side chain protecting groups may thereafter be cleaved by hyrogenation over a palladium catalyst to obtain a compound of formula XVIa, preferably as an acid addition salt. An alternate procedure is to retain the side chain protecting groups until after formation of a decapeptide having the amino acid sequence shown in formula XX.

The synthetic decapeptide LRF (XX) is obtained as shown in scheme I by reacting the azide of formula XIXb with the octapeptide of formula XVIa at a temperature between −40°C. and about +50°C. in an aqueous or non-aqueous solvent (e.g. dimethylformamide, tetrahydrofuran, etc.). The azide may be formed in situ without isolation from the reaction medium by reacting 5-oxoprolylhistidyl hydrazide (XIXa) with a reagent which will yield nitrous acid in situ to form the azide of formula XIXb thereafter adding the octapeptide of formula XVIa to the reaction medium to form the decapeptide LRF. The conversion of the hydrazide XIXa to the azide XIXb may be carried out under the same conditions and using the same reagents previously described in connection with the formation of the azide of formula VIIIb. An acid acceptor such as triethylamine is included in the reaction medium when the octapeptide XVIa is in the form of an acid addition salt in order to liberate the octapeptide as a free base (XVIa) in situ for reaction with the azide of formula XIXb. While it is preferred to react the azide (XIXb) in situ after conversion from the corresponding hyrazide (XIXa), it is possible to isolate the azide as a crystalline compound.

In scheme I, the preferred protecting groups are: benzyloxycarbonyl (R); benzyl($R^2$); nitro ($R^8$).

In place of a compound of formula XIXb the preparation of the decapeptide (XX) can be carried out by reacting an octapeptide (XVIa) with a compound of the formula p—Glu—His($N^{im}$—$R^9$)—$N_3$ (XIXb—1) wherein $N^{im}$ means the nitrogen atoms of the imidazole ring and $R^9$ is a protecting group for the imidazole nitrogens illustrated by tosyl, benzyl, trityl, 2,2,2-trifluoro-1-benzyloxycarbonylaminoethyl and 2,2,2-trifluoro-1-tert-butyloxycarbonylaminoethyl to form the decapeptide p—Glu—His($N^{im}$—$R^9$)—Trp—Ser—Tyr—Gly—Leu—Arg—Pro—Gly—$NH_2$. The protecting group of histidine may then be removed by using a suitable reagent such as $H_2$/Pd or other reagent described by Schroeder and Lubke supra, at pages 72–74. The histidine protected dipeptide of formula XIXb—1 is obtained from the corresponding hydrazide p—Glu—His($N^{im}$—$R^9$)—$NHNH_2$.

In place of a compound of formula XVIa, a compound of formula XVIb can be reacted with an azide of formula XIXb or XIXb-1 to obtain a decapeptide of the formula p—Glu—His—Trp—Ser($R^4$)—Tyr($R^2$)—Gly—Leu—Arg($N^G$—$R^8$)—Pro—Gly—$NH_2$ (XXa) or p—Glu—His($N^{im}$—$R^9$)—Trp—Ser($R^4$)—Tyr($R^2$)—Gly—Leu—Arg($N^G$—$R^8$)—Pro—Gly—$NH_2$ (XXb), respectively. These decapeptides may then be deprotected in the same manner previously indicated by using a suitable cleaving reagent as has already been described to obtain LRF (XX).

The dipeptides of formula XIXa can be prepared through several routes, one of which is illustrated by the following scheme:

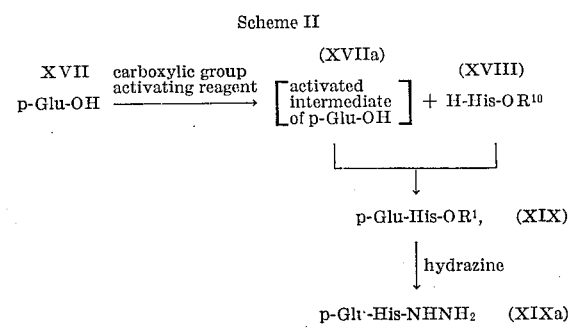

Scheme II

In the foregoing scheme pyroglutamic acid (0.5-oxoproline) of formula XVII is reacted with a carboxyl group activating reagent. Suitable activating reagents are those well known in the peptide art for activating the carboxyl moiety. Among the more common types are (1) carbodiimides (e.g. N,$N^1$-dicyclohexycarbodiimide, N-ethyl $N^1$-(γ-dimethylamino propyl carbodiimide); (2) cyanamides (e.g. N,N-dibenzylcyanamide; (3) keteimines; (4) isoxazolium salts (e.g. N-ethyl-5-phenyl isoxazolium-$3^1$-sulfonate; (5) monocyclic nitrogen containing heterocyclic amides of aromatic character containing one through four nitrogens in the ring such as imidazolides, pyrazolides, 1,2,4-triazolides. Specific heterocyclic amides that are useful include N,N¹-carbonyl diimidazole, N,N¹-carbonyl-di-1,2,4-triazole; (6) alkoxylated acetylene (e.g. ethoxyacetylene); (7) reagents which form a mixed anhydride with the carboxyl moiety of the amino acid (e.g. ethylchloroformate, isobutylchloroformate) and (8) nitrogen-containing heterocyclic compounds having a hydroxy group on one ring nitrogen (e.g. N-hydroxyphthalimide N-hydroxysuccinimide, 1-hydroxybenzotriazole). Other activating reagents and their use in peptide coupling are described by Schroeder and Lubke supra, in Chapter III and by Kapoor, *J. Pharm. Sci.* 59, pp. 1–27, (1970). The activated intermediate XVIIa is then coupled with a carboxylic acid ester of histidine (XVIII) at a temperature between about −40°C. and +20°C. The ester group defined by $R^{10}$ may be lower alkyl (e.g. methyl, ethyl, etc.) benzyl or benzyl substituted by nitro or methoxy. The ester of histidine (XVIII) may be present in the reaction medium while the activated intermediate XVIIa is being formed from XVII or it may be added after pyroglutamic acid is converted to the activated intermediate depending on the choice of activation. The coupling reaction to form the dipeptide (XIX) is carried out in the presence of an inert organic solvent such as dimethylformamide, chloroform, dioxane, toluence, methylene chloride, etc. If the ester of histidine (XVIII) is added to the reaction medium as an acid addition salt, an acid acceptor is included in the reaction medium so that a free base is formed which reacts with the activated intermediate XVIIa. The dipeptide (XIX) formed by the coupling of XVIII and XVIII is then converted to the hydrazide (XIXa) by reaction with hydrazine in alcoholic solution.

Other materials can be used to prepare the dipeptide XIXa. For example, an $N^{im}$ protected histidine carboxylic acid ester can be used in place of a compound of formula XVIII. The protecting group on the imidazole ring may be split off by conventional procedures after formation of p—Glu—His($N^{im}$—$R^9$)—NHNH$_2$ to yield the dipeptide XIXa or the protecting group can be retained until after the formation of the decapeptide as previously explained. Another route for preparing the dipeptide XIXa is to couple the activated intermediate XVIIa with His—NHNHR$^6$ (XVIIIa—1) or His(-$N^{im}$—$R^9$)—NHNHR$^6$ (XVIIIa—2) wherein $R^6$ is a protecting group such as trityl, tert-butyloxycarbonyl or benzyloxycarbonyl to form p—Glu—His—NHNHR$^6$ (XIXa—1) or p—Glu—His($N^{im}$—$R^9$)—NHNHR$^6$ (XIXa—2) and thereafter cleaving the $R^6$ protecting group to form the dipeptide XIXa.

Another procedure for obtaining a compound of formula XIXa is to prepare p—Gly—His—OH in the manner described by Geiger et al., Biochem. and *Biophys. Res. Comm.*, 45, 1971, at page 769 (scheme 2) and convert this dipeptide by esterification to p—Glu—His—OR$^{10}$ (XIX) followed by reaction with hydrazine to make the hydrazide.

Tetrapeptides of formula VIIIa can be prepared by different routes, one such route is shown below:

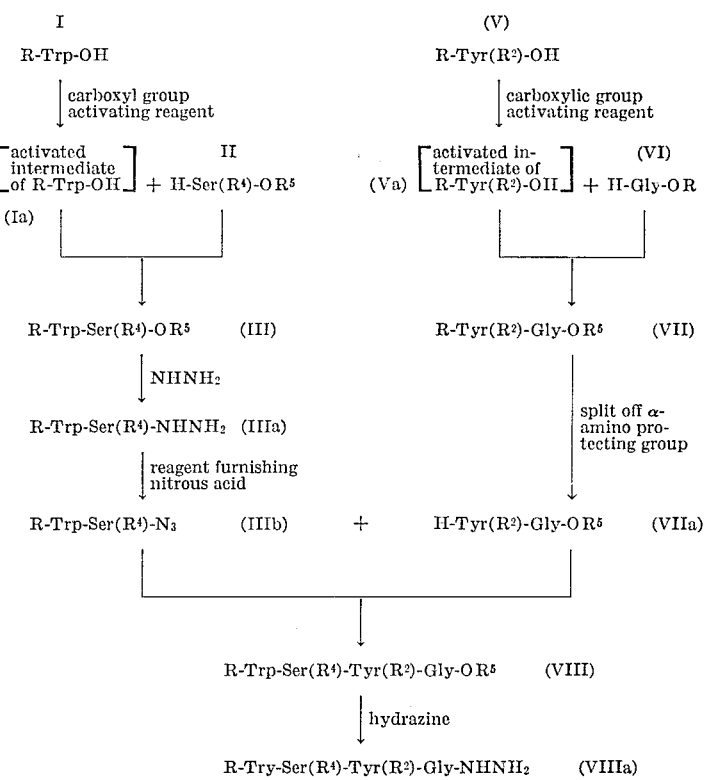

In scheme III, α-amino protected tryptophan (I) is activated with a carboxyl activating reagent at a temperature between about −40°C. and +20°C. to provide the activated intermediate Ia. Suitable activating reagents are those previously mentioned in connection with coupling of p—Glu—OH (XVII) with His—OR$^5$ (XVIII). A particular preferred activating reagent is dicyclohexylcarbodiimide. The activated intermediate Ia is coupled with a carboxylic acid ester of serine or a carboxylic acid ester of hydroxyl protected serine under reaction conditions previously described in connection with scheme II. The resulting dipeptide (III) is treated with hydrazine in alcoholic solution to obtain the corresponding hydrazide (IIIa), this reaction being carried out at a temperature in the range of −40°C. and +50°C. The hydrazide is then reacted with a reagent that furnishes nitrous acid, such reagent being exemplified by any one of those previously described to form the azide of formula IIIb. The azide may be isolated but is preferably formed in situ after which the dipeptide of formula VIIa is reacted with it to form the tetrapeptide of formula VIII, this reaction being carried out at a temperature between −40°C. and +20°C. This tetrapeptide is converted to its hydrazide (VIIIa) by reaction with hydrazine in alcoholic solution.

The dipeptide of formula VII is obtained by activating an α-amino and hydroxyl protected tyrosine (V) with a carboxyl group activating reagent. A reagent which forms a mixed anhydride, such as isobutylchloroformate has been found particularly suitable for activation. The activated intermediate V(a) then reacts with a carboxylic acid ester of glycine under suitable coupling conditions including a temperature between about −40°C. and +20°C. to form the dipeptide of formula VII. The α-amino protecting group on tyrosine is then cleaved to yield the dipeptide VIIa. If the α-amino protecting is tert-butyloxycarbonyl, it can be cleaved using trifluoroacetic acid without cleavage of a hydroxyl protecting group such as benzyl or tosyl. The selection of the α-amino and hydroxyl protecting group is not critical except that the selection of these groups should be such that the α-amino protecting group can be cleaved under conditions and using reagents which do not cleave the $R^2$ group on tyrosine. Other standard cleaving reagents are described by Schroeder and Lubke supra pp. 72–74.

Various modifications in the synthesis of the tetrapeptide of formula VIIIa illustrated by scheme III are possible. For example, activated intermediate Ia can be coupled with a compounds of the formula Ser—NHNH—$R^6$ to yield R—Trp—Ser—NHNH—$R^6$ (IIIb). The $R^6$ group can be cleaved under conditions which will not cleave the α-amino protecting group on tryptophan to give the hydrazide of formula IIIa. Thus, if R is benzyloxycarbonyl, $R^6$ can be trityl or tert-butyloxycarbonyl, these latter two groups being cleaved by trifluoroacetic acid whereas benzyloxycarbonyl is stable to this reagent. Another alternate in the synthesis of the tetrapeptide VIIIa is to replace the carboxylic acid ester of glycine with Gly—NHNH—$R_6$ (VIa) and couple this protected hydrazide with the activated intermediate Va to obtain R—Tyr($R^2$)—Gly—NHNH—$R^6$ (VIIb) which is then treated to cleave R without cleavage of $R^2$ and $R^6$. This can be achieved if R is tert-butyloxycarbonyl, $R^2$ is benzyl and $R^6$ is tosyl and the cleaving reagent is trifluoroacetic acid. The resulting dipeptide Tyr($R^2$)—Gly—NHNH—$R^6$ (VIIc) is then coupled to the dipeptide of formula IIIa to obtain the tetrapeptide R—Trp—Ser—Tyr($R^2$)—Gly—NHNH—$R^6$ (VIIIc) which is then converted to a tetrapeptide of formula VIIIa by cleavage of $R^6$ in the manner previously described. In the foregoing alternate routes, the same carboxyl group activating reagents may be used as used in connection with schemes II and III.

The tetrapeptide of formula XVa can be prepared by the following route:

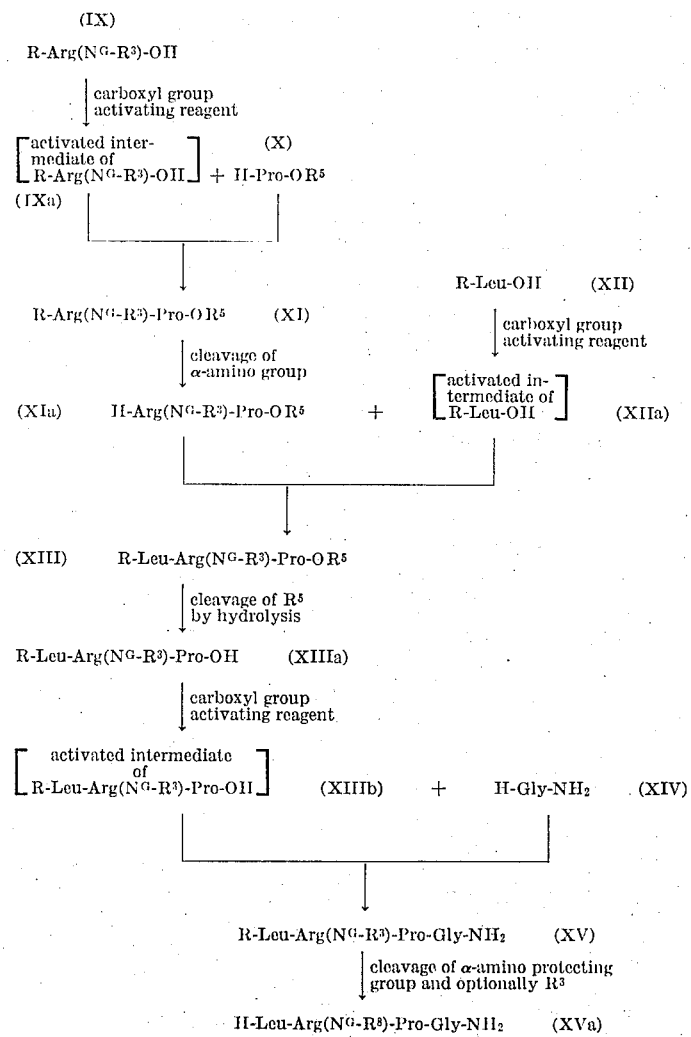

Scheme IV

In scheme IV, a compound of formula IX is activated with a suitable carboxyl group activating reagent illustrated by the types previously described to obtain activated intermediate IXa which is not isolated, this intermediate reacting with a carboxylic acid ester of proline (X) at a temperature of between about −40°C. and +20°C. to obtain a dipeptide of formula XI. A particularly useful $R^3$ protecting group is nitro, and R is an α-amino protecting group which can be cleaved without cleavage of the $R^3$ group. The dipeptide of formula XI is then treated with a suitable α-amino protecting group cleaving reagent such as HBr in acetic acid to obtain a HBr salt of H—Arg($N^G$—$R^3$)—Pro—$OR^5$ as represented by formula XIa. This dipeptide is reacted with a carboxyl group activated intermediate of α-amino protected leucine (XIIa) at a temperature of between about −40°C. and +20°C. to obtain a tripeptide of formula XIII. This tripeptide is treated to cleave the ester group such as by alkaline hydrolysis to yield the corresponding acid of formula XIIIa. Illustrative of suitable reagents include methanolic or ethanolic sodium hydroxide or potassium hydroxide; aqueous organic mixtures such as methanol/water, acetone/water; dioxane/aqueous sodium hydroxide. Alkali hydrolysis is normally carried out at room temperature but temperatures as high as 40°C. can be employed. Acid hydrolysis can also be used to cleave the ester function. Catalytic hydrogenation to cleave certain ester groups such as benzyl ester can be used but in such a case, the α-amino protecting group selected for leucine and the $N^G$-protecting group on arginine should be stable to the hydrogenation conditions. The tripeptide of formula XIIIa is then reacted with a carboxyl group activating reagent to form the activated intermediate XIIIb which is reacted with glycinamide to produce the tetrapeptide of formula XV. The glycinamide is preferably included in the reaction medium as an acid addition salt because it is more stable in such form and converted to the free base in situ by inclusion of an acid acceptor of the type previously described in the reaction medium. This tetrapeptide is then treated with a standard cleaving reagent for removal of the α-amino protecting group on leucine, with or without removal of the protecting group on the $N^G$ of arginine. Where the α-amino protecting group is benzyloxycarbonyl and nitro is the protecting group on arginine, HBr in acetic acid is a cleaving reagent which removes the α-amino protecting group but not the nitro group. Similarly, if R is tert-butyloxycarbonyl and $R^3$ is tosyl, the cleaving reagent may be HBr in acetic acid, trifluoroacetic acid or alcoholic HCl solution, none of these reagents cleaving the tosyl group. Where R is trityl and $R_3$ is nitro or tosyl, glacial or aqueous acetic acid is a suitable cleaving reagent for cleavage of trityl. If it is desired to cleave both the α-amino and arginine protecting groups, hydrogenation over a palladium catalyst in acetic acid is useful for this purpose. The tetrapeptide obtained by removal of the α-amino protecting group on leucine is preferably recovered in the form of an acid addition salt, generally the bromide, chloride, trifluoroacetate or acetate salt.

Various modifications in scheme IV are possible in the synthesis of the tetrapeptide of formula XVa. For example, the activated intermediate of formula IX may be coupled with Pro—NHNH$R^6$ to yield R—Arg(-$N^G$—$R^3$)—Pro—NHNH—$R^6$ followed by cleavage of R without cleavage of $R^6$ such as by using trifluoroacetic acid (e.g. $R^6$ is benzyloxycarbonyl R is tert-butyloxycarbonyl and $R^3$ is tosyl). The resulting dipeptide H—Arg($N^G$—$R^3$)—Pro—NHNH—$R^6$ is recovered, preferably as an acid addition salt. This dipeptide is then coupled in the presence of an acid acceptor with activated intermediate XIIa to obtain R—Leu—Arg(-$N^G$—$R^3$)—Pro—NHNH—$R^6$ wherein R is tert-butyloxycarbonyl. Thereafter the $R^6$ group is cleaved using a reagent to which the R and $R^3$ protecting groups are stable such as hydrogen in the presence of Pd on charcoal which cleaves the benzyloxycarbonyl protecting group but not tert-butyloxycarbonyl (R) or tosyl ($R^3$). A further modification of scheme IV is to use a carboxylic acid ester of glycine of the formula Gly—$OR^5$ in place of the glycinamide and react it with the activated intermediate of formula XIIIb to yield R—Leu—Arg($N^G$—$R^3$)—Pro—Gly—$OR^5$ which is then either (1) converted to Leu—Arg—($N^G$—$R^3$)—Pro—Gly—$OR^5$ by cleavage of the α-amino protecting group as previously described followed by conversion of the ester ($OR^5$) to the C-terminated amide (formula XVa) by treating the ester with ammonia in alcoholic solution between about 0°C. and room temperature of saponification of the ester to the free acid followed by formation of the mixed anhydride which in turn is reacted with ammonia to form the C-terminated amide of formula XVa; or (2) reversal of the step sequence just described by first converting R—Leu—Arg($N^G$—$R^3$)—Pro—Gly—$OR^5$ to the C-terminated amide R—Leu—Arg($N^G$—$R^3$)—Pro—Gly—$NH_2$ (XV) and then cleavage of the α-amino protecting group to obtain a compound of formula XVa. However, the use of glycinamide is preferred over a carboxylic acid ester of glycine because the treatment of a C-terminated ester with ammonia in alcohol to convert it to the C-terminated amide may result in cleavage of the proline-glycine bond or other side reactions.

The following examples are illustrative of the preferred process for the preparation of synthetic LRF and the intermediates used in such synthesis.

EXAMPLE 1

L-(5-Oxoprolyl)-L-histidine methyl ester

L-5-Oxoproline (13 gr, 0.1 mole) and L-histidine methyl ester dihydrochloride (22.8 gr, 0.1 mole) are suspended in dimethylformamide (200 ml). The mixture is treated with triethylamine (27 ml, 0.2 moles) and cooled at −5°C., then dicyclohexylcarbodiimide (20.6 gr, 0.1 mole) is added and the mixture is stirred for 2 hours at −5°C and overnight at room temperature. The dicyclohexylurea which separates is filtered off and the filtrate is evaporated to dryness. The residue is triturated with water and the insoluble solid is filtered off. The filtrate is evaporated to dryness and the residue dried twice with abs. ethanol. The oily residue crystallizes from abs. EtOH to afford the above titled dipeptide methyl ester 13 g (45%), m.p. 198°–199°C; $[\alpha]_D^{22}$ −4.3 (cl, Methanol); $R_f$(n-Butanol-water-acetic acid 4:1:1) 0.30; $R_f$(n-Butanol-water-acetic acid-pyridine 30:24:6:20) 0.50; single spot with Pauly and $I_2$ reagents.

Anal. Cald. for $C_{12}H_{16}N_4O_4$ (280.28) C 51.42, H 5.75, N 19.99

Found: C 51.34, H 6.04, N 20.12

Example 2

L-(5-Oxoprolyl)-L-histidyl hydrazide

L-(5-Oxoprolyl)-L-histidine methyl ester of Example 1 (10 gr. 0.036 moles) is dissolved in methanol (150 ml) and treated with hydrazine hydrate 99% (8 ml) at −10°C for 1 hour then at room temperature overnight. The white solid which separates is filtered and washed with methanol and then with ether. Recrystallization from water-ethanol affords the above-titled dipeptide hydrazide 8.8 gr (88% - Recrystallization from wather-ethanol [78%] m.p. 241.5°–242°C; $[\alpha]_D^{22}$ −14.50 (c 1, H$_2$O); R$_f$(n-Butanol-water-acetic acid 4:1:1) 0.05; R$_f$(n-Butanol-water-acetic acid-pyridine 30:24:6:20) 0.10; single spot with Pauly and I$_2$ reagents.

EXAMPLE 3

N-Benzyloxycarbonyl-L-tryptophyl-L-serine methyl ester

N-Benzyloxycarbonyl-L-tryptophan (24.5 gr, 0.0725 moles) is dissolved in dimethylformamide (200 ml) and mixed with L-serine methyl ester hydrochloride (11.25 gr, 0.073 moles), then cooled at −15°C and treated with triethylamine (10 ml, 0.073 moles) followed by dicyclohexylcarbodiimide (14.9 gr, 0.073 moles). The reaction mixture is stirred for 1 hour at −10°C. then at room temperature overnight. The dicyclohexylurea which separates is filtered off and the filtrate is evaporated to dryness. The residue is taken in ethylacetate, washed with 5% aq. KHSO$_4$, water, sat. aq. NaHCO$_3$, water, dried over sodium sulfate. Evaporation to dryness affords a foam which on trituration with ethyl acetate crystallizes to give the above-titled dipeptide ester. In another preparation the residue is crystallized from ethyl acetate-pentane, 26.8 gr (84%) m.p. 140°–141°C; R$_f$(Chloroform-methanol 10:1) 0.55; single spot with I$_2$ reagent.

EXAMPLE 4

N-Benzyloxycarbonyl-L-tryptophyl-L-seryl hydrazide

N-Benzyloxycarbonyl-L-tryptophyl-L-serine methyl ester of Example 3 (43.9 gr, 0.1 moles) is dissolved in dimethylformamide (200 ml) and methanol (400 ml) and treated with hydrazine hydrate (85 ml) overnight. Most of the methanol is removed in vacuo and the residue is treated with 1.5 volumes water to afford the above-titled crystalline compound 39 gr. (89%) m.p. 187°–188°C; R$_f$ (Chloroform-methanol 10:1) 0.00; R$_f$(n-Butanol-water-acetic acid 4:1:1) 0.75; R$_f$(n-Butanol-water-acetic acid-pyridine 30:24:6:20) 0.70; R$_f$(n-Butanol-water-pyridine 3:1.5:2) 0.75; single spot with I$_2$ and Erlich reagents.

EXAMPLE 5

N-Tert-Butyloxycarbonyl-O-benzyl-L-tyrosylglycine ethyl ester

N-Tert-Butyloxycarbonyl-O-benzyl-L-tyrosine (37.5 gr, 0.1 moles) is dissolved in tetrahydrofuran (200 ml) and cooled to −15°C, then N-methylmorpholine (11 ml, 0.1 moles) is added followed by isobutylchloroformate (13.4 ml, 0.1 moles). A white precipitate of the N-methylmorpholine hydrochloride is formed after approximately one minute. The reaction mixture is stirred for 5 minutes, then a solution of glycine ethyl ester hydrochloride (14 gr, 0.1 moles) and N-methylmorpholine (11 ml) in dimethylformamide (100 ml) is added and the mixture is left to reach room temperature overnight.

The solvent is evaporated in vacuo and the residue is taken in ethyl acetate-n-butanol (1:2) and washed with 5% aq. KHSO$_4$., water(brine), 5% Na$_2$CO$_3$ or NaHCO$_3$, water(brine) and dried over Na$_2$SO$_4$.

In another preparation the residue after the evaporation of the solvent is triturated with water and the crystalline solid is filtered and washed on the filter as above. In both cases the solid product is recrystallized from chloroform-hexane to afford the above-titled dipeptide ester 44 gr, (96.5%) m.p. 130°–132°C; R$_f$(Ethyl acetate-heptane 1:1) 0.50; R$_f$(Chloroform-methanol 25:1) 0.90.

EXAMPLE 6

O-Benzyl-L-tyrosyl-glycine ethyl ester trifluoroacetate

N-Tert-butyloxycarbonyl-O-benzyl-L-tyrosyl-glycine ethyl ester of Example 5 (20 gr, 0.044 moles) is dissolved in trifluoroacetic acid (200 ml) for the first 10 minutes in an ice bath, then for 50 minutes at room temperature after which time the excess trifluoroacetic acid is removed in vacuo and at 25°–30°C. The oily residue is evaporated twice with some dry ether to afford an oily compound. This material is rather soluble in ether but precipitates from hexane - yield quantitative; R$_f$(chloroform-methanol-acetic acid, 85:10:5) 0.50; R$_f$(chloroform-methanol, 10:1) 0.70.

EXAMPLE 7

N-Benzyloxycarbonyl-L-tryptophyl-L-seryl-O-benzyl-L-tyrosyl-glycine ethyl ester

N-Benzyloxycarbonyl-L-tryptophyl-L-seryl hydrazide of Example 4 (22 gr, 0.05 moles) is dissolved in dimethylformamide (200 ml) and cooled to −30°C, then 3N-HCl/tetrahydrofuran (50 ml, 0.15 moles) is added (in case of the hydrazide precipitating out of the solution or not dissolving, the hydrochloric acid will bring it into solution). Tert-butyl nitrite (7 ml, 0.06 moles) is added and the solution is stirred at −30°C for 15–20 minutes, then, triethylamine is added (34 ml, 0.25 moles) and the cold mixture is treated with a solution of O-benzyl-L-tyrosyl-glycine ethyl ester trifluoroacetate (gummy material from 0.05 moles of the protected dipeptide of Example 6) in dimethylformamide (100 ml). The pH of the solution is kept at about 8 with triethylamine and the reaction mixture is stirred at −25°C for 2 hours, then is left to stand at −10°C for 24 hours, and at 0°C for 48 hours, after which time the triethylamine hydrochloride salt which separates is filtered and the filtrate evaporated to dryness.

The gummy residue is triturated with water to afford a solid which is washed on the filter with 1N-hydrochloric acid, water, sat. NaHCO$_3$ and water and dried. The solid is digested with boiling methanol and filtered to give the above-titled tetrapeptide 30 gr. (77%). The tetrapeptide can be further purified by recrystallization from dimethylformamide-water. m.p. 194°–195°C; R$_f$(Chloroform-methanol 10:1) 0.70; R$_f$(n-Butanol-water-acetic acid 4:1:1) 0.90.

EXAMPLE 8

N-Benzyloxycarbonyl-L-tryptophyl-L-seryl-O-benzyl-L-tyrosyl-glycyl hydrazide

N-Benzyloxycarbonyl-L-tryptophyl-L-seryl-O-benzyl-L-tyrosyl-glycine ethyl ester (1.3 gr, 1.7 m moles) of Example 7 is dissolved in a mixture of methanol-dimethylformamide (2.1) (50 ml) and treated with hydrazine hydrate 99% (2 ml) at room temperature and overnight. A white solid separates which is filtered and the filtrate is concentrated to half volume and diluted with one volume water. The solid which is separated is filtered and combined with the previous one (slow filtration). Yield 1 gr. (85%). m.p. 248°–250°C; R$_f$(n-Butanol-water-acetic acid 4:1:1) 0.5;

R_f(n-Butanol-water-acetic acid-pyridine 30:24:6:20) 0.7.

EXAMPLE 9

N-benzyloxycarbonyl-N$^G$-nitro-L-arginyl-L-proline methyl ester

N-Benzyloxycarbonyl-N$^G$-nitro-L-arginine (35.3 gr, 0.1 mole) is dissolved in 10% dimethylformamide in dichloromethane (ca. 150 ml) and cooled to −15°C, then N-methyl-morpholine (11.1 ml 0.1 mole) is added followed by isobutylchloroformate (13.4 ml, 0.1 mole) while the mixture was kept cold. After 5 minutes a cold solution of L-proline methyl ester hydrochloride (16.5 gr, 0.1 mole) and triethylamine (13.6 ml, 0.1 mole) in dimethylformamide is added. The temperature is brought to 0°C and maintained there for 1 hour, then allowed to rise to room temperature and remain there for 18 hours.

The mixture is filtered and the filtrate concentrated under reduced pressure at 30°C. The residue is taken up in 1:1 ethyl acetate/n-butanol and washed with 5% KHSO$_4$, water, aq. NaHCO$_3$, brine. The organic phase is dried over Na$_2$SO$_4$, filtered and concentrated in vacuo until a solid starts to precipitate. The solution is cooled to 0°C and left for 18 hours, then the crystalline compound which separated is filtered. Yield 16.3 gr. (35%) of the above titled product.

On further concentration of the mother liquor a second crop was obtained 18.7 gr (40%) mp.p 154-156°C; [α]$_D^{25}$ −46.7 (c 0.5, methanol); R$_f$(Chloroform-methanol 9:1) 0.6.

EXAMPLE 10

N$^G$-Nitro-L-arginyl-L-proline methyl ester, hydrobromide

N-Benzyloxycarbonyl-N$^G$-nitro-L-arginyl-L-proline methyl ester (16.3 gr, 35.1 m moles) of Example 9 is treated with 30% hydrobromic acid in glacial acetic acid (50 ml) for 1 hour and at room temperature. Dry ether (ca. 500 ml) is added to give a pale yellow very hygroscopic solid. The product is not characterized further due to the very hygroscopic nature. It is dried in vacuo over KOH and used for the next reaction.

EXAMPLE 11

N-Benzyloxycarbonyl-L-leucyl-N$^G$-nitro-L-arginyl-L-proline methyl ester

N-Benzyloxycarbonyl-L-leucine (8.84 gr, 33.4 m moles) is dissolved in tetrahydrofuran (100 ml) and cooled to −15°C. N-methylmorpholine (3.73 ml, 33.3 m moles) is added, followed by isobutylchloroformate (4.36 ml, 33.3 moles). After 5 minutes at −15°C, a solution of N$^G$-nitro-L-arginyl-L-proline methyl ester hydrobromide from Example 10 in dimethylformamide and adjusted to pH 7.5 with triethylamine, is added (during the neutralization the solution is kept at 0°C). The reaction mixture is kept at 0°C for 1 hour, then allowed to rise to room temperature slowly and remain there for 18 hours after which time the solvent is removed in vacuo and at 30°C. The residue is taken up in ethyl acetate/n-butanol, 2:1, and washed with 5% KHSO$_4$, water, aq. KHCO$_3$, brine. The organic phase is dried over sodium sulfate, filtered and concentrated under reduced pressure at 30°C. The resulting gum is taken up in ethyl acetate and precipitated with ether. A white solid of the above-identified product is obtained, 13.11 gr. (68 %). m.p. 93°–96°C;[α]$_D^{25}$−50.46 (c 0.34, Methanol); R$_f$(Chloroform-methanol 9:1) 0.70.

EXAMPLE 12

N-Benzyloxycarbonyl-L-leucyl-N$^G$-nitro-L-arginyl-L-proline

N-Benzyloxycarbonyl-L-leucyl-N$^G$-nitro-L-arginyl-L-proline methyl ester (13 gr, 23 m moles) of Example 11 is dissolved in 1:1 dioxane/N-sodium hydroxide (50 ml) and stirred for 2 hours at room temperature. Thin layer chromatography shows no starting material present. The solution is adjusted to pH 6.5 with 1.5 N-hydrochloric acid and concentrated in vacuo at 30°C to a small volume. The residue is diluted with water (ca.200 ml) and cooled to 0°C, then acidified to pH 3 with 1.5 N hydrochloric acid. The white solid which crystallizes out is collected and washed with cold water 11.8 gr. (92%); [α]$_D^{25}$ −54.84 (c 1, methanol); R$_f$ (n-Butanol-water-acetic acid-pyridine 30:24:6:20) 0.70.

EXAMPLE 13

N-Benzyloxycarbonyl-L-leucyl-N$^G$-nitro-L-arginyl-L-prolyl-glycine amide

N-Benzyloxycarbonyl-L-leucyl-N$^G$-nitro-L-arginyl-L-proline (5.64 gr, 10 m moles) of Example 12 is dissolved in tetrahydrofuran (ca. 50 ml) and cooled to −15°C., then N-methylmorpholine (1.12 ml, 10 m moles) is added followed by isobutylchloroformate (1.31 ml, 10 m moles). After 5 minutes at −16°C a cold mixture of glycine amide hydrochloride (2.11 gr, 20 m moles) and triethylamine (2.78 ml, 20 m moles) in dimethylformamide is added. The temperature is maintained at 0° for 1 hour, then allowed to warm to room temperature where it remained for 18 hours.

The reaction mixture is filtered and concentrated in vacuo at 30°C and the residue is taken up in ethyl acetate/n-butanol 1:1 and washed with 5%, KHSO$_4$, water, aq. KHCO$_3$, brine. The organic phase is dried over Na$_2$SO$_4$, filtered and concentrated under reduced pressure at 30°C to a gum. This gum is taken up in ethanol (ca. 20 ml) filtered and a white solid which is the above-titled product precipitates with ether. 5.85 gr. (94%) [α]$_D^{25}$ −46.37 (c 1, methanol); R$_f$(Chloroform-methanol 9:1) 0.26.

EXAMPLE 14

L-Leucyl-N$^G$-nitro-L-arginyl-L-prolyl-glycine amide hydrobromide

N-Benzyloxycarbonyl-L-leucyl-N$^G$-nitro-L-arginyl-L-prolyl-glycine amide (2 gr, 3.24 m moles) of Example 13 is treated with anhydrous HBr in acetic acid 30% (50 gr.) for 5 minutes in an ice bath, then for 1 hour at room tempeature. An excess of sodium dry ether is added to give a white, very hygroscopic, solid precipitate which is filtered and dried in vacuo over P$_2$O$_5$ and NaOH; R$_f$(n-Butanol-water-acetic acid 4:1:1) 0.20; R$_f$(n-Butanol-water-acetic acid-pyridine 30:24:6:20) 0.75.

EXAMPLE 15

N-Benzyloxycarbonyl-L-tryptophyl-L-seryl-O-benzyl-L-tyrosyl-glycyl-L-leucyl-N$^G$-nitro-L-arginyl-L-prolyl-glycine amide N-Benzyloxycarbonyl-L-tryptophyl-L-seryl-O-benzyl-L-tyrosyl-glycyl hydrazide (749, mg. 1 m mole) of Example 8 is dissolved in dimethylformamide (75 ml) and cooled at −20°C in a dry ice-acetone bath.

Three equivalents of 3N-HCl/tetrahydrofuran (1 ml, 3 m moles) are added followed by 1.5 equivalents of isoamylnitrite (0.266 ml). The reaction mixture is stirred at −20°C for 15 minutes, then it is treated with triethylamine (0.55 ml, 4 m moles). To this solution of the tetrapeptideazide, a solution of L-leucyl-N$^G$-nitro-L-arginyl-L-prolyl-glycine amide hydrobromide of Example 14 (570 mg, 1 m mole) in dimethylformamide (20 ml) and triethylamine (0.22 ml, 1.5 m mole), is added. The mixture is stirred for 2 hours at −20°C, then it is left to stand at 0°–5°C for 3 days. The solvent is evaporated in vacuo and at 30°C and the residue is triturated with excess water. A solid is precipitated which is filtered, washed thoroughly on the filter with 1N-HCl, H$_2$O and dried. The solid is then precipitated from methanol-ethylacetate-ether. Yield 600 mg. (50%) of the above-titled product, softens at 150°C; melts 170°C. dec; R$_f$(n-Butanol-water-acetic acid 4:1:1) 0.7; R$_f$(n-Butanol-water-acetic acid-pyridine 30:24:6:20) 0.9.

EXAMPLE 16

L-Tryptophyl-L-seryl-L-tyrosyl-glycyl-L-leucyl-L-arginyl-L-prolyl-glycine amide diacetate (XVII)

N-Benzyloxycarbonyl-L-tryptophyl-L-seryl-O-benzyl-L-tyrosylglycyl-L-leucyl-N$^G$-nitro-L-arginyl-L-prolyl-glycine amide of Example 15 (500 mg, 0.42 m moles) is dissolved in a mixture of methanol-glacial acetic acid - water (1:1:1, 60 ml) and hydrogenated in the presence of 5% Pd on charcoal (100 mg) for 20 hours. The catalyst is filtered off and the filtrate is evaporated to dryness (care should be taken to avoid prolonged exposure to the air in order to avoid oxidation of tryptophan). The residue is dried twice with absolute ethanol and then taken in some absolute ethanol and precipitated with dry ether to afford a hygroscopic solid in a yield of 382 mg (86%); R$_f$(N-butanol-water-acetic acid-pyridine 30:24:6:20) 0.7; and ninhydrin, Sakaguchi and Erlich reagents give single positive spot; cellulose plates R$_f$(n-Butanol-water-acetic acid 4:1:1) 0.3; and ninhydrin, Sakaguchi and Erlich reagents give positive spot; cellulose plates R$_f$(n-Butanol-water-acetic acid pyridine 30:24:6:20) 0.90;ninhydrin, Sakaguchi and Erlich reagents give positive spot.

amide (6 ml) [some hydrazide which remains insoluble is eventually dissolved after the treatment with the HCl in tetrahydrofuran] is treated with 3 N HCl/tetrahydrofuran (0.68 ml, 2.04 m moles). The mixture is cooled at −30°C in a dry-ice-acetone bath and then tert-butyl nitrite (0.0865 ml, 0.75 m moles) is added and under stirring after 15 minutes the solution is treated with triethylamine (0.239 ml, 7 equivalents) and then with a solution of L-tryptophyl-L-seryl-L-tyrosyl-glycyl-L-leucyl-L-arginyl-L-prolyl-glycine amide diacetate (Example 16) (297 mg. 0.28 m moles) in dimethylformamide (5 ml). The reaction mixture is stirred for 2 hours at −20°C, then over the weekend at 5°C after which time the solvent is evaporoated in vacuo and at 30°C, and the residue taken in some water and evaporated again to dryness, (some triethylamine hydrochloride which separates from the mixture is filtered off). A yield of the crude solid of 615 mg. is obtained, the excess weight being the amine salt. (Theoretical yield 385 mgr.)

The crude product on thin layer chromotagraphy (cellulose) shows one main spot accompanied by a second minor one with higher R$_f$ plus the triethylamine hydrochloride; R$_f$(n-Butanol-water-acetic acid 4:1:1) 0.31 major spot; Erlich, Sakaguchi and Pauly reagents give positive spot; R$_f$(n-Butanol-water-acetic acid 4:1:1) 0.40 minor spot; Erlich and Sakaguchi give positive spot but Pauly negative; R$_f$(n-Butanol-water-acetic acid-pyridine 30:24:6:20) 0.60 major spot; Erlich, Sakaguchi and Pauly reagents give positive spot; R$_f$(n-Butanol-water-acetic acid-pyridine 30:24:6:20) 0.7 minor spot.

A part of the crude product (500 mg) is chromatographed through a Sephadex G–25 (Fine) partition column (3 × 90 cm) equilibrated first with the lower phase of a mixture of n-butanol-acetic acid-water (4:1:5) then with the upper phase. The compound is dissolved in the minimum volume of the upper phase and applied carefully onto the column. The flow rate was 1 ml/minute and the fraction size 180 drops (approx. 4 ml). The fractions which are collected were examined by T.L.C. on cellulose and with the system n-butanol-water-acetic acid 4:1:1, and those which showed satisfactory purity are pooled and evaporated in a rotary

| Amino acid analysis | | | | | | | | |
|---|---|---|---|---|---|---|---|---|
| | Trp | Ser | Pro | Gly | Leu | Tyr | NH$_3$ | Arg |
| Calc.: | 1 | 1 | 1 | 2 | 1 | 1 | 1 | 1 |
| Found: | 0.81 | 0.90 | 0.99 | 1.92 | 1 | 0.97 | 1.01 | 0.93 |

EXAMPLE 17

L-(5-Oxoprolyl)-L-histidyl-L-tryptophyl-L-seryl-L-tyrosyl-glycyl-L-leucyl-L-arginyl-L-prolyl-glycine amide diacetate tetrahydrate (LRF)

L-(5-Oxoprolyl)-L-histidyl hydrazide of Example 2 (105 mg. 0.375 m moles) is dissolved in dimethylformevaporator at 30°C, to dryness. The residue is taken in 1% aqueous acetic acid and lyophilized to afford 100 mg. of a white fluffy solid; $[\alpha]_D^{25}$ −46.6 ± 1.2.

| Analysis | (C$_{55}$H$_{75}$N$_{17}$O$_{13}$, 2 CH$_3$CO$_2$H, 4H$_2$O); m.w. 1373 |
|---|---|
| Calcd.: | C, 51.58, H, 6.68, N, 17.35 |
| Found: | C, 51.12, H, 5.98, N, 17.74 |

| Amino acid analysis | | | | | | | | | |
|---|---|---|---|---|---|---|---|---|---|
| | Trp | Ser | Glu | Pro | Gly | Leu | Tyr | NH$_3$ | His | Arg |
| Calcd.: | 1 | 1 | 1 | 1 | 2 | 1 | 1 | 1 | 1 | 1 |
| Found: | 0.779 | 0.994 | 1.074 | 1.203 | 2.056 | 1 | 1.083 | 1.558 | 1.060 | 0.982 |
| | 0.774 | 0.957 | 1.046 | 1.123 | 2 | 0.968 | 1.037 | 1.546 | 1.022 | 0.966 |

In all of the above examples, unless otherwise specifically specified, the absorbent used for determination of $R_f$ values is "Merck" silica gel F-254, precoated plates. The cellulose referred to in the examples is "Avicel F" available from Analtech Inc.

The decapeptide obtained in Example 17 has been tested for the characteristic hormonal activity in releasing luteinizing hormone (LH). The LRF of Example 17 was found active in releasing LH from primary cultures of dispersed rate anterior pituitary cells when compared with the standard synthetic LRF of the Salk Institute whose activity is described by Vale et al., *Science*, 176, 933, (1972). In vivo release of LH using the compound of Example 17 was determined by administering this compound by catheter into the right jugular vein of ether anesthetized Sprague Dowley male rats weighing 250 –300 g. The blood is sampled by cardiac puncture at 0 time and after various time periods as indicated in the table below:

| Number of Animals | Dose gm/per rat | Time (min.) | Mean Plasma LH ng/ml* | |
|---|---|---|---|---|
| | | | Initial | Final |
| 2 | $25 \times 10^{-6}$ | 30 | 32±4 | 184 ±36 |
| 2 | $25 \times 10^{-6}$ | 15 | 24±2 | 109±10 |
| 1 | $1 \times 10^{-6}$ | 15 | 23±2 | 162±5 |
| 4 | $1 \times 10^{-6}$ | 15 | 25±4 | 107±10 |
| 1 | $1 \times 10^{-6}$ | 8 | 22±1 | 138±18 |
| 4 | $1 \times 10^{-7}$ | 15 | 33±2 | 83±6 |
| 2 | $1 \times 10^{-8}$ | 15 | 38±3 | 60±2 |
| 5 | controls (saline solution) | 15 | 33±2 | 25±2 |

*The LH was measured by radioimmuno assay and was based on National Institute of Arthritis and Metabolic Diseases - Reference Preparation I (NIAMD-RPI).

What is claimed is:
1. A tetrapeptide compound of the formula

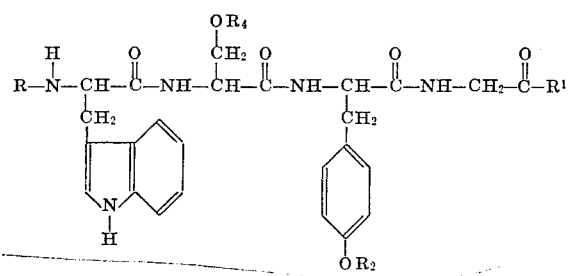

wherein:
R is an α-amino group characterized by not being split off during the coupling of the amino acid residues which form said tetrapeptide, and capable of being split off under reaction conditions which will not result in cleavage of the peptide chain;
$R^1$ is a member selected from the class consisting of $-NHNH_2$, $-NHNH-R^6$ and $-N_3$;
$R^2$ is a protecting group for the phenolic hydroxyl group of tyrosine selected from the class consisting of acetyl, tosyl, benzoyl, benzyl, tert-butyl, trityl and benzyloxycarbonyl;
$R^4$ is selected from the class consisting of a hydrogen atom on the alcoholic group of serine or a protecting group for said alcoholic group selected from acetyl, tosyl, benzoyl, benzyl, tert-butyl, trityl and benzyloxycarbonyl;
$R^5$ is a carboxyl protecting group selected from the class consisting of $C_1-C_6$ alkyl, benzyl, phenacyl, phthalimidomethyl, β-methylthioethyl, 4-(methylthio) phenyl, 4-picolyl, subsituted benzyl, said substitutent being selected from the class consisting of methoxy, methyl and nitro; and
$R^6$ is a protecting group selected from the class consisting of tert-butyloxycarbonyl, trityl and benzyloxycarbonyl; and with the proviso that R and $R^6$ are not the same and R is not the same as $R^2$ and $R^4$.

2. A compound according to claim 1 wherein R is selected from the class consisting of tert-butyloxycarbonyl, tert-amyloxycarbonyl, trityl, phthalyl, tosyl, allyloxycarbonyl, cyclopentyloxy carbonyl and a group of the formula

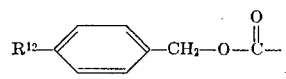

wherein: $R^{12}$ is selected from the class consisting of hydrogen, halo, methoxy and nitro.

3. A compound according to claim 2 wherein $R^4$ is hydrogen.

4. A compound according to claim 3 wherein $R^1$ is $-NHNH_2$.

5. A compound according to claim 3 wherein $R^1$ is $-N_3$.

6. A compound of claim 1 which is N-Benzyloxycarbonyl-L-tryptophyl-L-seryl-O-benzyl-L-tyrosyl-glycyl hydrazide.

7. A compound of claim 1, which is: N-Benzyloxycarbonyl-L-tryptophyl-L-seryl-O-benzyl-L-tyrosyl-glycyl azide.

8. A process which comprises the steps of:
a. reacting a tetrapeptide of the formula
R-Trp-Ser($R^4$)-Tyr—($R^2$)—Gly—$N_3$ with a tetrapeptide
H-Leu-Arg($N^G$—$R^8$)—Pro—Gly—$NH_2$ to obtain the octapeptide of the formula
R-Trp-Ser($R^4$)—Tyr($R^2$)—Gly—Leu—Arg(-$N^G$—$R^8$)—Pro—Gly—$NH_2$ wherein:
R is an α-amino protecting group characterized by not being split off during the coupling of the amino acid residues which form said octapeptide and capable of being split off under reaction conditions which will not result in cleavage of the peptide chain;
$R^2$ is a protecting group for the phenolic hydroxyl group of tyrosine selected from the class consisting of acetyl, tosyl, benzoyl, benzyl, tert-butyl, trityl and benzyloxycarbonyl;
$R^4$ is selected from the class consisting of a hydrogen atom on the alcoholic group of serine or a protecting group for said alcoholic group selected from acetyl, tosyl, benzoyl, benzyl, tert-butyl, trityl, and benzyloxycarbonyl;
$R^8$ is selected from the class consisting of hydrogen on each of the side chain nitrogens atoms of arginine or a protecting group on at least one but no more than two of the side chain nitrogens in arginine, said protecting group being selected from nitro, tosyl, adamantyloxycarbonyl, benzyloxycarbonyl and trityl; with the proviso that R is not the same as $R^2$, $R^4$, or $R^8$;
b. cleaving the α-amino protecting group from said octapeptide obtained in step (a).

9. A process according to claim 8 wherein said cleaving reagent used in said step (b) is one which will also cleave all side chain protecting groups on said octapeptide obtained in step (a).

10. A process according to claim 9 which includes the additional step of reacting the free base of said deprotected octapeptide obtained in step with the dipeptide p—Glu—His—N₃ to obtain LRF.

11. A process for preparing L-(5oxoprolyl)-L-histidyl-L-tryptophyl-L-seryl-L-tyrosyl-L-glycyl-L-leucyl-L-arginyl-L-prolyl-glycine amide which comprises the steps of:
a. reacting a tetrapeptide of the formula:

R-Trp-Ser(R⁴)—Tyr(R²)—Gly—NHNH₂ with a reagent that yields nitrous acid in situ in the presence of a strong acid to convert said tetrapeptide to the azide R—Trp—Ser(R⁴)—Tyr(R²)—Gly—N₃;

b. reacting said azide obtained in step (a) with a tetrapeptide of the formula H—Leu—Arg(N^G—R⁸-)—Pro—Gly—NH₂ to obtain an octapeptide of the formula:

R—Trp—Ser(R⁴)—Tyr(R²)—Gly—Leu—Arg(-N^G—R⁸)—Pro—Gly—NH₂;

c. cleaving the side chain and α-amino protecting groups from said octapeptide obtained in step (b); and d. reacting said deprotected octapeptide with p—Glu—His—N₃ to form said LRF or its acid addition salt; wherein:

R is an α-amino protecting group characterized by not being split off during the coupling of the amino acid residues which form said octapeptide and capable of being split off under reaction conditions which will not result in cleavage of the peptide chain;

R² is a protecting group for the phenolic hydroxyl group of tyrosine selected from the class consisting of acetyl, tosyl, benzoyl, benzyl, tert-butyl, trityl and benzyloxycarbonyl;

R⁴ is selected from the class consisting of a hydrogen atom on the alcoholic group of serine or a protecting group for said alcoholic group selected from acetyl, tosyl, benzoyl, benzyl, tert-butyl, trityl, and benzyloxycarbonyl; and R⁸ is selected from the class consisting of hydrogen on each of the side chain nitrogens atoms of arginine or a protecting group on at least one but no more than two of the side chain nitrogens in arginine, said protecting group being selected from nitro, tosyl, adamantyloxycarbonyl, benzyloxycarbonyl and trityl; with the proviso that R is not the same as R², R⁴, or R⁸.

12. A process according to claim 11 wherein R is selected from the class consisting of tert-butyloxycarbonyl, tert-amyloxycarbonyl, trityl, phthalyl, toxyl, allyloxycarbonyl, cyclopentyloxycarbonyl and a group of the formula

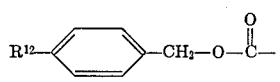

wherein R¹² is selected from the class consisting of hydrogen, nitro, methoxy and halo.

13. A process according to claim 12 wherein said α-amino and side chain protecting groups are removed by hydrogenation.

14. A process which comprises reacting N-Benzyloxycarbonyl-L-tryptophyl-L-seryl-O-benzyl-L-tyrosyl-glycyl hydrazide with a reagent yielding nitrous acid in a strong acid to form the corresponding azide, reacting said azide with L-leucyl-N^G-nitro-L-arginyl-L-prolyl-glycine amide to form the octapeptide N-Benzyloxycarbonyl-L-tryptophyl-L-seryl-O-benzyl-L-tyrosyl-glycyl-L-leucyl-N^G-nitro-L-arginyl-L-proline-glycine amide, cleaving the protecting groups from said octapeptide by hydrogenation over a palladium catalyst and reacting said deprotected octapeptide with the dipeptide p—Glu—His—N₃ to form LRF, said dipeptide formed in situ by reacting p—Glu—His—NHNH₂ with a reagent yielding nitrous acid in the presence of a strong acid.

15. A process for producing the tetrapeptide R—Trp—Ser(R⁴)—Tyr(R²)—Gly—NH—NH₂, which comprises:
a. reacting R—Trp—OH with a carboxyl group activating reagent;
b. reacting said carboxyl activated compound obtained in step (a) with H—Ser(R⁴)—OR⁵ to form the dipeptide R—Trp—Ser(R⁴)—OR⁵;
c. reacting said dipeptide obtained in step (b) with hydrazine to obtain R—Trp—Ser(R⁴)—NHNH₂;
d. reacting said dipeptide obtained in step (c) with a reagent yielding nitrous acid in the presence of a strong acid to form R—Trp—Ser(R⁴)—N₃ and reacting said dipeptide with H—Tyr(R²)—Gly—OR⁵ to form the tetrapeptide R—Trp—Ser(R⁴)—Tyr(R²)—Gly—OR⁵; and
e. reacting said tetrapeptide obtained in step (d) with hydrazine to obtain R—Trp—Ser(R⁴)—Tyr(R²)—Gly—NH—NH₂; wherein:

R is an α-amino protecting group characterized by not being split off during the coupling of the amino acid residues which form said tetrapeptide and capable of being split off under reaction conditions which will not result in cleavage of the peptide chain;

R² is a protecting group for the phenolic hydroxyl group of tyrosine selected from the class consisting of acetyl, tosyl, benzoyl, benzyl, tert-butyl, trityl and benzyloxycarbonyl;

R⁴ is selected from the class consisting of a hydrogen atom on the alcoholic group of serine or a protecting group for said alcoholic group selected from acetyl, tosyl, benzoyl, benzyl, tert-butyl, trityl, and benzyloxycarbonyl; and R⁵ is a carboxyl protecting group selected from the class consisting of C₁-C₄ alkyl, benzyl, phenacyl, phthalimidomethyl, β-methylthiomethyl, 4-(methylthio)phenyl, 4-picolyl, substituted benzyl, said substituent being selected from the class consisting of methoxy methyl and nitro; with the proviso that R is not the same as R² and R⁴.

16. A process according to claim 15 wherein R is benzyloxycarbonyl, R² is benzyl and R⁴ is hydrogen.

17. A process for preparing the tetrapeptide R—Leu—Arg(N^G—R³)—Pro—Gly—NH₂ which comprises:
a. reacting R—Arg(N^G—R³)—OH with a carboxyl group activating reagent;
b. reacting the activated compound obtained in step (a) with H—Pro—OR⁵ to form the dipeptide R—Arg(N^G—R³)—Pro—OR⁵;
c. cleaving the α-amino protecting group from said dipeptide obtained in step (b);
d. reacting said dipeptide obtained in step (c) with a compound of the formula R—Leu—OH having its carboxyl group activated to form the tripeptide R—Leu—Arg($N^G$—$R^3$)—Pro—$OR^5$;

e. hydrolyzing said tripeptide ester obtained in step (d) to obtain the corresponding free acid;

f. reacting said tripeptide obtained in step (e) with a carboxyl group activating reagent and reacting the resulting activated compound with glycinamide to obtain the tetrapeptide R—Leu—Arg($N^G$—$R^3$)—Pro—$Gly^{NH}_2$; wherein:

R is an α-amino protecting group characterized by not being split off during the coupling of the amino acid residues which form said tetrapeptide and capable of being split off under reaction conditions which will not result in cleavage of the peptide chain;

$R^3$ is selected from the class consisting of nitro, tosyl, adamantyloxycarbonyl, benzyloxycarbonyl and trityl; $R^5$ is selected from the class consisting of lower alkyl; benzyl; substituted benzyl said substituent selected from the class consisting of nitro, methyl and methoxy; phenacyl, phthalimidomethyl, β-methylthioethyl, 4-picolyl and 4-(methylthio)phenyl; with the proviso that R and $R^3$ are not the same.

18. A process according to claim 17 wherein R is benzyloxycarbonyl, $R^3$ is nitro and $R^5$ is lower alkyl.

19. A process for preparing L-(5-oxoprolyl)-L-histidyl-L-tryptophyl-L-seryl-L-tyrosyl-glycyl-L-leucyl-L-arginyl-L-prolyl-glycine amide which comprises the steps of:

a. reacting R—Trp—OH with a carboxyl group activating reagent;

b. reacting the activated compound obtained in step (a) with H—Ser($R^4$)—$OR^5$ to form the dipeptide R—Trp—Ser($R^4$)—$OR^5$;

c. reacting said dipeptide obtained in step (b) with hydrazine to obtain R—Trp—Ser($R^4$)—$NHNH_2$;

d. reacting said dipeptide obtained in step (c) with a reagent yielding nitrous acid in the presence of a strong acid to form R—Trp—Ser($R^4$)—$N_3$;

e. reacting R—Trp—Ser($R^4$)—$N_3$ with H—Tyr($R^2$)—Gly—$OR^5$ to form the tetrapeptide R—Trp—Ser($R^4$)—Tyr($R^2$)—Gly—$OR^5$;

f. reacting the tetrapeptide of step (e) with hydrazine to obtain R—Trp—Ser($R^4$)—Tyr($R^2$)—Gly—$NHNH_2$;

g. reacting R—Arg($N^G$—$R^3$)—OH with a carboxyl group activating reagent;

h. reacting the activated compound obtained in step (g) with H—Pro—$OR^5$;

i. cleaving the α-amino protecting groups from said dipeptide obtained in step (h), said cleaving reagent being one to which said $R^3$ and $R^5$ groups are stable;

j. reacting the dipeptide H—Arg($N^G$—$R^3$)—Pro—$OR^5$ with a compound of the formula R—Leu—OH having its carboxyl group activated, to form the tripeptide R—Leu—Arg($N^G$—$R^3$)—Pro—$OR^5$;

k. hydrolyzing the tripeptide obtained in step (j) to split off the carboxylic acid ester group and obtain the tripeptide R—Leu—Arg($N^G$—$R^3$)—Pro—OH;

l. reacting said tripeptide obtained in step (k) with a carboxyl group activating reagent and reacting the resulting activated compound with glycinamide to obtain the tetrapeptide R—Leu—Arg($N^G$—$R^3$)—Pro—Gly—$NH_2$;

m. cleaving the α-amino protecting group from the tetrapeptide obtained in step (1);

n. reacting the tetrapeptide R—Trp—Ser($R^4$)—Tyr($R^2$)—Gly—$NHNH_2$ with a reagent yielding nitrous acid in the presence of a strong acid to form R—Trp—Ser($R^4$)—Tyr($R^2$)—Gly—$N_3$ and reacting said tetrapeptide with H—Leu—Arg($N^G$—$R^3$)—Pro—Gly—$NH_2$ to form the octapeptide R—Trp—Ser($R^4$)—Tyr($R^2$)—Gly—Leu—Arg($N^G$—$R^3$)—Pro—Gly—$NH_2$;

o. cleaving the α-amino and side chain protecting groups from the octapeptide formed in step (n) and reacting the deprotected octapeptide with p—Gly—His—$N_3$; wherein:

R is an α-amino protecting group characterized by not being split off during the coupling of the amino acid residues which form said octapeptide and capable of being split off under reaction conditions which will not result in cleavage of the peptide chain;

$R^2$ is selected from the class consisting of acetyl, tosyl, benzoyl, benzyl, tert-butyl, trityl and benzyloxycarbonyl.

$R^3$ is selected from the class consisting of nitro, tosyl, adamantyloxycarbonyl, benzyloxycarbonyl and tosyl;

$R^4$ is selected from the class consisting of the hydrogen atom on the alcoholic hydroxyl group of serine and a protecting group on the hydroxyl group of serine selected from the class consisting of acetyl, tosyl, benzoyl, benzyl, tert-butyl, trityl, and benzyloxycarbonyl;

$R^5$ is selected from the class consisting of lower alkyl, benzyl, phenacyl, phthalimidomethyl, β-methylthiomethyl, 4-picolyl, 4-(methylthio)phenyl and substituted benzyl, said substituent being selected from the class consisting of methoxy, methyl and nitro; and with the proviso that R is not the same as $R^2$, $R^3$, or $R^4$.

20. A process according to claim 19 wherein all of steps (a) through (o) are carried out at a temperature below +20°C.

21. A process according to claim 19 wherein said cleavage in step (o) is carried out by hydrogenation.

22. A process according to claim 19 wherein R is benzyloxylcarbonyl, $R^2$ is benzyl, $R^3$ is nitro and $R^4$ is hydrogen.

23. A process according to claim 22 wherein the carboxyl group activating reagent used in steps (a) is dicyclohexylcarbodiimide and the carboxyl group activating reagent used in steps (g) and (l) is one which forms a mixed anhydride with the carboxyl group.

24. A process according to claim 23 wherein the cleaving reagent used in steps (i) and (m) is selected from the class consisting of HBr in acetic acid and trifluoroacetic acid.

* * * * *

UNITED STATES PATENT OFFICE
CERTIFICATE OF CORRECTION

PATENT NO. : 3,855,198
DATED : December 17, 1974
INVENTOR(S) : Dimitrios Sarantakis It is certified that error appears in the above-identified patent and that said Letters Patent are hereby corrected as shown below:

Column 1, line 10, after "5-oxoprolyl" the parenthesis should be closed;

Column 2, line 43, the formula "R-Trp-Ser($r^4$)-Tyr($R^2$)-Gly-$R^1$" should be --R-Trp-Ser($R^4$)-Tyr($R^2$)-Gly-$R^1$)--;

Column 6, line 57 "0.5" should be --$\varepsilon$.5--;

Column 19 (claim 1) delete last four lines "$R^5$ is a carboxyl protecting group selected from the class consisting of $C_1$-$C_6$ alkyl, benzyl, phenacyl, phthalimidomethyl, β-methylthioethyl, 4-(methylthio)phenyl, 4-picolyl, substituted benzyl";

Column 20 (claim 1) delete in lines 1 and 2 "said substituent being selected from the class consisting of methoxy, methyl and nitro";

Column 21 (claim 10, line 2) line 2, after "step" insert --(b)--;

(claim 12, line 4) line 54, "toxyl" should be --tosyl--;

Column 24 (claim 19) line 19, "Gly" should be --Glu--.

Signed and Sealed this ninth Day of September 1975

[SEAL]

Attest:

RUTH C. MASON
Attesting Officer

C. MARSHALL DANN
Commissioner of Patents and Trademarks